(12) United States Patent
Nishiyama

(10) Patent No.: US 7,467,114 B1
(45) Date of Patent: Dec. 16, 2008

(54) SYSTEM FOR COLLECTING COMMODITY SPECIFICATIONS AND RELATED CUSTOMER INFORMATION

(75) Inventor: Kohei Nishiyama, Matsudo (JP)

(73) Assignee: Elephant Design Co., Ltd., Tokyo (JP)

( * ) Notice: Subject to any disclaimer, the term of this patent is extended or adjusted under 35 U.S.C. 154(b) by 822 days.

(21) Appl. No.: 10/070,265

(22) PCT Filed: Aug. 25, 2000

(86) PCT No.: PCT/JP00/05751

§ 371 (c)(1),
(2), (4) Date: Feb. 25, 2002

(87) PCT Pub. No.: WO01/16818

PCT Pub. Date: Mar. 8, 2001

(30) Foreign Application Priority Data

Aug. 26, 1999 (JP) ................. 11-239502

(51) Int. Cl.
*G06F 17/00* (2006.01)
(52) U.S. Cl. .................................. 705/400
(58) Field of Classification Search ................. 705/400
See application file for complete search history.

(56) References Cited

U.S. PATENT DOCUMENTS 5,357,439 A * 10/1994 Matsuzaki et al. ............ 700/96
6,167,383 A * 12/2000 Henson ....................... 705/26
6,243,691 B1 * 6/2001 Fisher et al. ................. 705/37
6,553,347 B1 * 4/2003 Tavor et al. .................. 705/14
6,631,356 B1 * 10/2003 Van Horn et al. ............ 705/26

FOREIGN PATENT DOCUMENTS

JP 05-274326 10/1993
JP 08-115367 5/1996

OTHER PUBLICATIONS

Creese, Robert C., "Break-Even Analysis—The Fixed Quantity Approach," Transactions of AACE International, 1993, pp. A.1.1-A.1.7.*
Abo Hideo. Service enabling pre-market research over the Web through popularity poll by consumers on creations by product designers, Product design, marketing, 3-D, CG, Nikkei Computer Graphics 2, 1999, p. 52. (English translation attached.).
Hiroko Nagano, Group purchasing service "accompany" Joint purchasing performed on the Net As more people want it, the price goes down, Nikkei NetBusiness, May 2000, pp. 192-194, (English translation attached.).

* cited by examiner

*Primary Examiner*—John W Hayes
*Assistant Examiner*—Nathan Erb
(74) *Attorney, Agent, or Firm*—Knobbe Martens Olson & Bear LLP

(57) ABSTRACT

A commodity idea of a proposal type is presented to users via a network, and wishes of the users concerning commodity specifications are collected as information. Then, the final product specifications are determined and the demand for the commodity is grasped. This makes it possible to develop a commodity with as little risk as possible and to allow the users to obtain a commodity having specifications that satisfy the user's wishes at a relatively low price.

9 Claims, 23 Drawing Sheets

| No | FILE NAME USED IN PATENT APPLICATION | No | ACTUAL DB NAME |
|---|---|---|---|
| 1 | FUNDAMENTAL INFORMATION RECORDING FILE | 1 | COMMODITY DB |
| | | 2 | CONTENTS DB |
| | | 3 | PROVISIONAL ESTIMATE DB |
| | | 4 | ESTIMATE DB |
| 2 | ANSWER RECORDING FILE | 1 | MEMBER DB |
| | | 2 | BBS DB |
| | | 3 | VOTE DB |
| | | 4 | PROVISIONAL RESERVATION DB |
| | | 5 | RESERVATION DB |
| | | 6 | TASTE DB |

FIG. 6

| No | key | ITEM NAME | ATTRIBUTE | SAMPLE VALUE |
|---|---|---|---|---|
| 1 | ○ | COMMODITY CODE | int | 1, 2 |
| 2 | | COMMODITY DISPLAY CLASSIFICATION CODE | tinyint | 0, 1 |
| 3 | | USER ID | char(5) | "E0001", "E0002" |
| 4 | | COMMODITY CLASSIFICATION CODE | char(3) | "001", "002" |
| 5 | | ITEM CODE | int | 1, 2 |
| 6 | | COMMODITY NAME | varchar(100) | "TPF", "SIZE R" |
| 7 | | OUTLINE OF COMMODITY | varchar(50) | "TPF", "SIZE R" |
| 8 | | EXPLANATION OF COMMODITY | varchar(200) | "MD CASE", "palm" |
| 9 | | COMMODITY INFORMATION html FILE NAME | varchar(100) | "/list/tpf/index.htm", "/list/r5/index.htm" |
| 10 | | MANUFACTURER CODE | char(10) | "0000000001", "0000000002" |
| 11 | | MANUFACTURER COMMODITY CODE | varchar(30) | |
| 12 | | MEDIA CODE | char(10) | "2000007000", "2000005001" |
| 13 | | BBS GROUP No | int | 1, 2 |
| 14 | | ORIGINATOR | varchar(50) | "ICHIRO SUZUKI", "HANAKO YAMADA" |
| 15 | | ORIGINATOR'S OCCUPATION | varchar(40) | "ARCHITECT", "COPY WRITER" |
| 16 | | MEDIA LOGO FILE NAME FOR PUBLICATION | varchar(100) | "/image/logo_dn27x27.gif" "/image/logo_luckdas65x24.gif" |
| 17 | | COMMERCIALIZATION INDEX | real | 10.0, 11.0 |
| 18 | | REGISTRATION DATE | smalldatetime | 2000-05-10 00:00:00, 2000-05-23 19:00:00 |
| 19 | | REGISTERED USER ID | char(5) | "E0006", "E0007" |
| 20 | | LAST UPDATE DATE | smalldatetime | 2000-05-10 00:00:00, 2000-05-23 19:00:00 |
| 21 | | LAST UPDATED USER ID | char(5) | "E0006", "E0007" |

FIG. 7

| No | key | ITEM | ATTRIBUTE | SAMPLE VALUE |
|---|---|---|---|---|
| 1 | O | CONTENTS ID | int | 1, 2 |
| 2 | | PROJECT CODE | char(10) | "C000000001","C000000002" |
| 3 | | DISTRIBUTION START DATE | smalldatetime | 2000-04-19 08:00:00, 2000-07-01 07:30:00 |
| 4 | | TERM OF VALIDITY | smalldatetime | 2010-03-31 17:00:00, 2010-05-05 00:00:00 |
| 5 | | ARTICLE TITLE | varchar(77) | "top","login" |
| 6 | | ARTICLE OUTLINE | varchar(600) | "TPF design","TPF plan" |
| 7 | | ARTICLE html FILE NAME | varchar(100) | "index.htm","login.htm" |
| 8 | | ARTICLE html PASS NAME | varchar(100) | "d:¥Inetpub¥wwwroot¥","_top" |
| 9 | | ABSOLUTE PASS FROM www ROUTE | varchar(100) | "/contactus/","/sitemap/" |
| 10 | | ARTICLE ARRANGEMENT ORDER | tinyint | 1, 2 |
| 11 | | WRITER ID | char(5) | "E0001","E0007" |
| 12 | | ARTICLE CREATION DATE AND TIME | smalldatetime | 2000-04-19 08:00:00, 2000-07-01 07:30:00 |
| 13 | | PRODUCER ID | char(5) | "E0001","E0007" |
| 14 | | ARTICLE APPROVAL DATE AND TIME | smalldatetime | 2000-04-19 08:00:00, 2000-07-01 07:30:00 |
| 15 | | FLAG OF CONTENTS DEDICATED TO MEMBER | bit | 0, 1 |
| 16 | | REGISTRATION DATE | smalldatetime | 2000-04-19 08:00:00, 2000-07-01 07:30:00 |
| 17 | | REGISTERED USER ID | char(5) | "E0001","E0007" |
| 18 | | LAST UPDATE DATE | smalldatetime | 2000-04-19 08:00:00, 2000-07-01 07:30:00 |
| 19 | | LAST UPDATED USER ID | char(5) | "E0001","E0007" |

FIG. 8

| No | key | ITEM NAME | ATTRIBUTE | SAMPLE VALUE |
|---|---|---|---|---|
| 1 | O | CANDIDATE ITEM No | int | 1, 2 |
| 2 | O | BUSINESS CONTACT'S CODE FOR OBTAINING PROVISIONAL ESTIMATE | char(10) | "2000001000", "2000002000" |
| 3 | O | PROVISIONAL ESTIMATE No | tinyint | 1, 2 |
| 4 | | PROJECT CODE | char(10) | "C000000001", "C000000002" |
| 5 | | BUSINESS CONTACT'S ESTIMATE No | varchar(20) | "No. 0012345678", "No. 00000112AS" |
| 6 | | PROVISIONAL ESTIMATE DATE | smalldatetime | 2000-04-19 08:00:00, 2000-07-01 07:30:00 |
| 7 | | TERM OF VALIDITY OF PROVISIONAL ESTIMATE | smalldatetime | 2000-04-19 08:00:00, 2000-07-01 07:30:00 |
| 8 | | SPECIAL NOTE | varchar(500) | "THIS IS A SPECIAL NOTE","NOTHING PARTICULAR" |
| 9 | | REGISTRATION DATE | smalldatetime | 2000-04-19 08:00:00, 2000-07-01 07:30:00 |
| 10 | | REGISTERED USER ID | char(5) | "E0001", "E0007" |
| 11 | | LAST UPDATE DATE | smalldatetime | 2000-04-19 08:00:00, 2000-07-01 07:30:00 |
| 12 | | LAST UPDATED USER ID | char(5) | "E0001", "E0007" |

F I G. 9

| No | key | ITEM | ATTRIBUTE | SAMPLE VALUE |
|---|---|---|---|---|
| 1 | ○ | COMMODITY CODE | int | 1, 2 |
| 2 | ○ | BUSINESS CONTACT'S CODE FOR OBTAINING ESTIMATE | char(10) | "2000001000", "2000002000" |
| 3 | ○ | ESTIMATE No | tinyint | 1, 2 |
| 4 | | BUSINESS CONTACT'S ESTIMATE No | varchar(20) | "No.0012345678", "No.00000112AS" |
| 5 | | ESTIMATE CREATION DATE | smalldatetime | 2000-04-19 08:00:00, 2000-07-01 07:30:00 |
| 6 | | TERM OF VALIDITY OF ESTIMATE | smalldatetime | 2000-04-19 08:00:00, 2000-07-01 07:30:00 |
| 7 | | SPECIAL NOTE | varchar(500) | "THIS IS A SPECIAL NOTE","NOTHING PARTICULAR" |
| 8 | | AUTOMATIC CALCULATION APPLICATION FLAG | bit | 0, 1 |
| 9 | | REGISTRATION DATE | smalldatetime | 2000-04-19 08:00:00, 2000-07-01 07:30:00 |
| 10 | | REGISTERED USER ID | char(5) | "E0001", "E0007" |
| 11 | | LAST UPDATE DATE | smalldatetime | 2000-04-19 08:00:00, 2000-07-01 07:30:00 |
| 12 | | LAST UPDATED USER ID | char(5) | "E0001","E0007" |

FIG. 10

| No | key | ITEM | ATTRIBUTE | SAMPLE VALUE |
|---|---|---|---|---|
| 1 | ○ | MEMBER ID | char(8) | "00000001", "00000002" |
| 2 | | DELETION FLAG | bit | 0,1 |
| 3 | | BUSINESS CONTACT'S CODE | char(10) | "0000000001","2000001000" |
| 4 | | PASSWORD | varchar(20) | "abcdefg", "1234567" |
| 5 | | MEMBER'S NAME | varchar(50) | "ICHIRO SUZUKI","HANAKO YAMADA" |
| 6 | | MEMBER'S NAME IN KANA | varchar(50) | "ICHIRO SUZUKI","HANAKO YAMADA" |
| 7 | | HANDLE NAME | varchar(50) | "ICHIRO","HANAKO" |
| 8 | | POSTAL CODE | varchar(30) | "167-0051", "233-0007" |
| 9 | | PREFECTURE CLASSIFICATION CODE | tinyint | 1,2 |
| 10 | | CITY, TOWN, VILLAGE, AND WARD | varchar(100) | "SUGINAMI-KU, OGIKUBO","KONAN-KU, OOKUBO" |
| 11 | | HOUSE NUMBER | varchar(100) | "1-6-7", "22-303" |
| 12 | | APARTMENT NAME | varchar(100) | "COSMO Y BUILDING, 6F","OGIKUBO HEIGHTS 404" |
| 13 | | TELEPHONE NUMBER | varchar(30) | "03-1234-5678", "045-123-4567" |
| 14 | | BIRTH DATE | smalldatetime | 1900-11-11 00:00:00, 1976-07-09 00:00:00 |
| 15 | | OCCUPATION CLASSIFICATION CODE | tinyint | 1,2 |
| 16 | | OTHER OCCUPATIONS | varchar(60) | "DOCTOR","ACTOR" |
| 17 | | GENDER | bit | 0,1 |
| 18 | | E-MAIL | varchar(60) | "info@xart.co.jp", "ino@cuusoo.com" |
| 19 | | DESIRE TO RECEIVE E-MAIL | bit | 0,1 |
| 20 | | KEYWORD1 | varchar(20) | "ITALY", "'70s" |
| 21 | | KEYWORD2 | varchar(20) | "ITALY", "'70s" |
| 22 | | KEYWORD3 | varchar(20) | "ITALY", "'70s" |
| 23 | | KEYWORD4 | varchar(20) | "ITALY", "'70s" |
| 24 | | KEYWORD5 | varchar(20) | "ITALY", "'70s" |
| 25 | | KEYWORD6 | varchar(20) | "ITALY", "'70s" |
| 26 | | KEYWORD7 | varchar(20) | "ITALY", "'70s" |
| 27 | | COMMENTS | varchar(60) | "THANK YOU IN ADVANCE","THIS IS A COMMENT" |
| 28 | | MAIL ADDRESS DISPLAY CLASSIFICATION | bit | 0,1 |
| 29 | | RESIDENTIAL AREA DISPLAY CLASSIFICATION | bit | 0,1 |
| 30 | | AGE DISPLAY CLASSIFICATION | bit | 0,1 |

FIG. 11

| 31 | TASTE CLASSIFICATION CODE (COI TAG CLASSIFICATION CODE) | int | 1,2 |
|---|---|---|---|
| 32 | TASTE CODE (COI TAG CODE) | int | 1,2 |
| 33 | REGISTRATION DATE | smalldatetime | 2000-05-17 00:00:00, 2000-05-18 00:00:00 |
| 34 | LAST UPDATE DATE | smalldatetime | 2000-05-17 00:00:00, 2000-05-18 00:00:00 |

FIG. 12

| No | key | ITEM | ATTRIBUTE | SAMPLE VALUE |
|---|---|---|---|---|
| 1 | ○ | BBS GROUP No | int | 1, 2 |
| 2 | ○ | STATEMENT RECORD No | int | 1, 2 |
| 3 | | MEMBER ID | char(8) | "00000001", "00000002" |
| 4 | | PARENT'S STATEMENT RECORD No | int | 1, 2 |
| 5 | | STATEMENT DATE AND TIME | datetime | 2000-05-20 01:49:35.077 |
| 6 | | MESSAGE TITLE | varchar(77) | "TEST","I'LL DO MY BEST" |
| 7 | | MESSAGE BODY | varchar(2000) | "THIS IS TEST","I'LL DO MY BEST" |
| 8 | | PASSWORD FOR DELETION OF STATEMENT | varchar(4) | "abcd", "1234" |
| 9 | | IMAGE FILE NAME | varchar(50) | "ATTACHMENT", "upload" |
| 10 | | IMAGE FILE EXTENSION | varchar(10) | "gif", "jpg" |
| 11 | | DATE AND TIME FOR SORTING | datetime | 2000-05-20 01:49:35.077 |

FIG. 13

| No | key | ITEM | ATTRIBUTE | SAMPLE VALUE |
|---|---|---|---|---|
| 1 | ○ | COMMODITY CODE | int | 1, 2 |
| 2 | ○ | NUMBER OF VOTES CONDUCTED | tynyint | 1, 2 |
| 3 | ○ | MEMBER ID | char(8) | "00000001", "00000002" |
| 4 | | VOTE DATE AND TIME | smalldatetime | 2000-05-20 01:59:00, 2000-05-23 11:37:00 |
| 5 | | VOTE IP ADDRESS | varchar(30) | "192.168.0.14", "192.168.0.17" |

F I G. 14

| No | key | ITEM | ATTRIBUTE | SAMPLE VALUE |
|---|---|---|---|---|
| 1 | ○ | MEMBER ID | char(8) | "00000001", "00000002" |
| 2 | ○ | COMMODITY CODE | int | 1, 2 |
| 3 | ○ | LOT STATEMENT No | tynyint | 1, 2 |
| 4 | | PROVISIONAL RESERVATION DATE AND TIME | smalldatetime | 2000-05-31 19:10:00, 2000-06-06 11:50:00 |
| 5 | | NUMBER OF PROVISIONALLY RESERVED UNITS | tynyint | 0, 1 |
| 6 | | PROVISIONAL RESERVATION PRICE | money | 1980.0000, 3980.0000 |

FIG. 15

| No | key | ITEM | ATTRIBUTE | SAMPLE VALUE |
|---|---|---|---|---|
| 1 | O | MEMBER ID | char(8) | "00000001","00000002" |
| 2 | O | COMMODITY CODE | int | 1,2 |
| 3 | O | BUSINESS CONTACT'S CODE | char(10) | "2000001000","2000002000" |
| 4 | O | COMMODITY MODEL NUMBER | varchar(20) | "CGRO-TYPE1","CGRO-TYPE2" |
| 5 | | CUSTOMER CLASSIFICATION | tynyint | 1,2 |
| 6 | | RESERVATION DATE AND TIME | datetime | 2000-06-19 20:07:39.000 |
| 7 | | NUMBER OF UNITS RESERVED | tynyint | 1,2 |
| 8 | | COMPANY NAME | varchar(100) | "A Co., Ltd.","B Ltd." |
| 9 | | COMPANY NAME IN KANA | varchar(100) | "KABUSHIKIGAISYA EI", "YUUGENGAISYA BII" |
| 10 | | POST NAME 1 | varchar(50) | "PLANNING DEPARTMENT", "GENERAL AFFAIRS DEPARTMENT" |
| 11 | | POST NAME 2 | varchar(50) | "DEVELOPMENT SECTION","PERSONNEL SECTION" |
| 12 | | JOB TITLE NAME | varchar(25) | "SECTION CHIEF","SUBSECTION CHIEF" |
| 13 | | FAX NUMBER | varchar(30) | "03-1234-5678","045-1234-5678" |
| 14 | | MOBILE TELEPHONE NUMBER | varchar(30) | "090-1234-5678","070-1234-5678" |
| 15 | | DESTINATION FLAG | int | 1,2 |
| 16 | | PAYMENT METHOD | tynyint | 1,2 |
| 17 | | DESTINATION (POSTAL CODE) | varchar(30) | "167-0051","233-0041" |
| 18 | | DESTINATION (PREFECTURE) | tynyint | 1,2 |
| 19 | | DESTINATION (CITY, TOWN, VILLAGE, AND WARD) | varchar(100) | "SUGINAMI-KU, OGIKUBO", "HONMOKU-KU, YAMASHITA-CYO" |

FIG. 16

| 20 | DESTINATION (HOUSE NUMBER) | varchar(100) | "1-6-7", "123" |
|---|---|---|---|
| 21 | DESTINATION (APARTMENT) | varchar(100) | "COSMO Y BUILDING, 6F","OGIKUBO HEIGHTS, 404" |
| 22 | DESTINATION (TELEPHONE NUMBER) | varchar(30) | "03-1334-5678","045-123-5678" |
| 23 | INPUTTED NAME OF BUSINESS CONTACT | varchar(50) | "ICHIRO SUZUKI","HANAKO YAMADA" |
| 24 | INPUTTED NAME IN KANA OF BUSINESS CONTACT | varchar(50) | "ICHIRO SUZUKI","HANAKO YAMADA" |
| 25 | INPUTTED e-mail OF BUSINESS CONTACT | varchar(60) | "info@xart.co.jp","ino@cuuusoo.com" |
| 26 | REMARKS | varchar(500) | "THIS IS A REMARK","NOTHING PARTICULAR" |

VOTE DEADLINE = 2000/06/08 08:59:00

※VOTE AFTER DEADLINE WILL BE REFLECTED IN THE NEXT VOTE RESULT

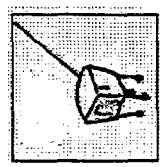

Erty NO. 01
DESK PET

 VOTE

A WHITE BOX LIKE TOFU HAVING LEGS WITH SMALL TIRES. ALTHOUGH INORGANIC AND FUNCTIONAL PARTS ARE USED, THE APPEARANCE GIVES A LIVELY IMPRESSION IN SOME WAY. A SMALL PET ON A DESK.

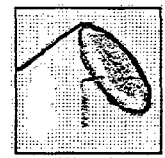

Erty NO. 02
SPINDLE

 VOTE

THIS HAS A SPINDLE SHAPE LIKE AN ALMOND MADE OF PRESSED ALUMINUM. IT IS JOYFUL TO SEE A STATE WHERE THE ROUNDED SHAPE SWINGS AND TILTS ON A DESK. THERE IS GIVEN METALLIC COLOR THROUGH ANODIZED ALUMINUM PROCESSING TO GIVE FUTURE-LIKE IMAGE.

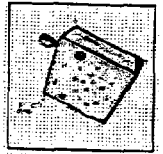

Erty NO. 03
Square Fizz

 VOTE

THIS HAS A RELAXED AND CLEAR IMPRESSION AND IT IS JOYFUL TO SHOW OFF. THIS HAS A DESIGN WITH A SOMEWHAT RACY TASTE AND CAPTURES YOU. HOW ABOUT FLAVOR OF "FIZZ"?

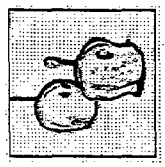

Erty NO. 04
Aqua Fizz

 VOTE

THIS IS CHARMING SOMEWHERE AS WELL AS OBEDIENT, AND GIVES IMPRESSION AS IF IT WILL BE INSTANTLY ATTACHED TO ANYONE LIKE A PARTNER. THIS HAS A DESIGN GIVING AN IMPRESSION AS IF IT WILL TELL YOU, "HI, LET'S SPEND TODAY CHEERFULLY".

FIG. 19

```
FANCY LIFE
FILE  EDIT  VIEW  FAVORITES  TOOLS  HELP
BACK  FORWARD  STOP  REFRESH  HOME  SEARCH  FAVORITES  HISTORY  MAIL  FONT  PRINT  EDIT
ADDRESS http://wire/reserv/asp/reserv.asp                                    MOVE  LINKS
```

COMMODITY NAME : CIGARRO PC
Mr. uemura

---

TOTAL AMOUNT FOR MAIN BODY:

CARRIAGE (PER UNIT)

TOTAL AMOUNT TO BE PAID (PER UNIT)

DAYS TO BE TAKEN FOR DELIVERY:

WARRANTY PERIOD :

PLEASE INPUT INFORMATION
* CONCERNING RESERVATION *

| NUMBER OF UNITS TO BE RESERVED | SELECT ONE ▼ |
| PAYMENT METHOD | SELECT ONE ▼ |
| DESTINATION | |

DONE                                    INTRANET

FIG. 23

SYSTEM FOR COLLECTING COMMODITY SPECIFICATIONS AND RELATED CUSTOMER INFORMATION

This application is the U.S. National Phase under 35 U.S.C. §371 of International Application PCT/JP00/05751, filed Aug. 25, 2000, which claims priority to Japanese patent application Ser. No. 11/239,502, filed Aug. 26, 1999. The International Application was published under PCT Article 21(2) in a language other than English.

TECHNICAL FIELD

The present invention relates to a system for collecting commodity specifications and related customer information that are used to determine specifications and to grasp demand during development of a new commodity.

BACKGROUND ART

Conventionally, during development of a new commodity, a user layer, commodity specifications including a design, an appropriate price, and the like have been determined on the basis of data obtained by market research and the like conducted in advance.

This means that it is impossible to determine whether a development result (new commodity) will be accepted by the market before the commodity is actually put on sale. Therefore, there exists a high risk that it becomes impossible to recoup money invested in development and production if demand is erroneously forecasted.

Consequently, money invested in development of commodities whose development ended in failure needs to be recovered by some hit commodities, so that commodities are priced higher than their values.

Also, with the conventional technique, commodities are sold after production on the basis of estimation, so that an advertisement cost, a sales cost, and a marketing cost run up and these costs are added to their prices. This results in a situation where commodities are further high priced.

Meanwhile, also on the user side, made-to-order commodities are expensive and it is unrealistic to purchase such commodities. Therefore, under present circumstances, users have no other choice but to purchase commodities developed by manufacturers on the basis of forecasts and they purchase and use, with tolerance, commodities whose specifications differ from those that they really want.

In order solve the technical problem, the present invention provides a technique with which specifications of a commodity and, in particular, design information of the commodity are presented to users through a network, and wishes of the users concerning the presented specifications are collected as information. Then, the final specifications of the commodity are determined and demand for the commodity is also grasped. This makes it possible to develop a commodity with as little risk as possible and to allow the user to obtain a commodity having specifications that satisfy the user's wishes at a relatively low price.

DISCLOSURE OF THE INVENTION

With the technique of the present invention, a system for developing commodity specifications and for collecting related customer information comprises: an information presenting means for presenting fundamental information concerning the design and the like of a commodity under development; and an answer recording means for receiving and recording an answer from a user to whom the fundamental information is presented.

Also, the answer as to the presented fundamental information from the user is at least one of an answer concerning commodity specifications desired by the user and an answer concerning a wish to purchase a commodity having the presented specifications.

Also, the system is added with a commodity specification presenting means for presenting, to an answerer (user), commodity specifications corresponding to the answer or commodity specification information related to a price.

Further, the fundamental information concerning the commodity under development contains a menu prepared for each element of the specifications of the commodity under development, thereby allowing the answerer to return an answer indicating the desired commodity specifications through a selection from the menu. Also, the fundamental information or the commodity specification information presented to the answerer contains a plurality of expected selling prices.

The presentation of the information, the reception of the answer, and a recording means of the present invention are realized by a bidirectional communication system that uses a personal computer connected to a public communication network, such as the Internet.

In this case, a host computer functioning as a server is provided with a commodity price calculating means, thereby making it possible to provide the answerer (user terminal) with a commodity price calculated on the basis of estimate information and the cumulative number of purchase candidates.

It should be noted here that there may be employed a means that uses a telephone or a facsimile or may be employed a face-to-face system that uses a paper medium or the like.

Also, a commodity price determining means is constructed as follows, so that it is possible to determine a price in accordance with the strength of user's intention to purchase the commodity.

That is, the commodity price calculating means includes: a function of performing a comparison operation by comparing the estimate information with an expected amount of sales obtained by multiplying the cumulative number of purchase candidates by their desired purchasing prices; a function of, if it is not expected as a result of the comparison operation that an appropriate amount of profit will be generated, transmitting, to each purchase wishing person, a message showing that an expected amount of sales falls below a required amount and a message requesting the user to increase the desired purchasing prices; and a function of performing a comparison operation by comparing an expected amount of sales calculated through the multiplication on the basis of the increased desired purchasing prices with an estimated price.

With the technique of the present invention, the production of a commodity is started after a reservation for the commodity is accepted. This makes it possible to reduce a risk concerning funds as little as possible, to develop a new commodity even with small funds, and to create a new market by a small-lot production of a variety of products.

It should be noted here that the commodity developed with the technique of the present invention includes intangible commodities provided by so-called service businesses, such as group tours, seminars, and insurances, in addition to tangible commodities, such as industrial goods.

BRIEF DESCRIPTION OF THE DRAWINGS

FIG. 6 is a n explanatory diagram showing database constructions of a fundamental information recording file and an answer recording file of the embodiment.

FIG. 7 is an explanatory diagram showing a construction of a commodity database of the embodiment.

FIG. 8 is an explanatory diagram showing a construction of a contents database of the embodiment.

FIG. 9 is an explanatory diagram showing a construction of a provisional estimate database of the embodiment.

FIG. 10 is an explanatory diagram showing a construction of an estimate database of the embodiment.

FIG. 11 is an explanatory diagram (1) showing a construction of a member database of the embodiment.

FIG. 12 is an explanatory diagram (2) showing the construction of the member database of the embodiment.

FIG. 13 is an explanatory diagram showing a construction of a BBS database of the embodiment.

FIG. 14 is an explanatory diagram showing a construction of a vote database of the embodiment.

FIG. 15 is an explanatory diagram showing a construction of a provisional reservation database of the embodiment.

FIG. 16 is an explanatory diagram (1) showing a construction of a reservation database of the embodiment.

FIG. 17 is an explanatory diagram (2) showing the construction of the reservation database of the embodiment.

FIG. 18 shows a commodity idea presenting screen displayed on a user's monitor in the embodiment.

FIG. 19 shows a membership registration screen displayed on the user's monitor in the embodiment.

FIG. 23 shows a reservation screen displayed on the user's monitor in the embodiment.

BEST MODE FOR CARRYING OUT THE INVENTION

First Embodiment

An embodiment of the present invention will be described below by taking, as an example, development of a case for a mobile telephone.

This embodiment relates to an example of a case where a demand trend is confirmed and determined at a stage where specifications of a commodity are almost determined.

Figure 1:
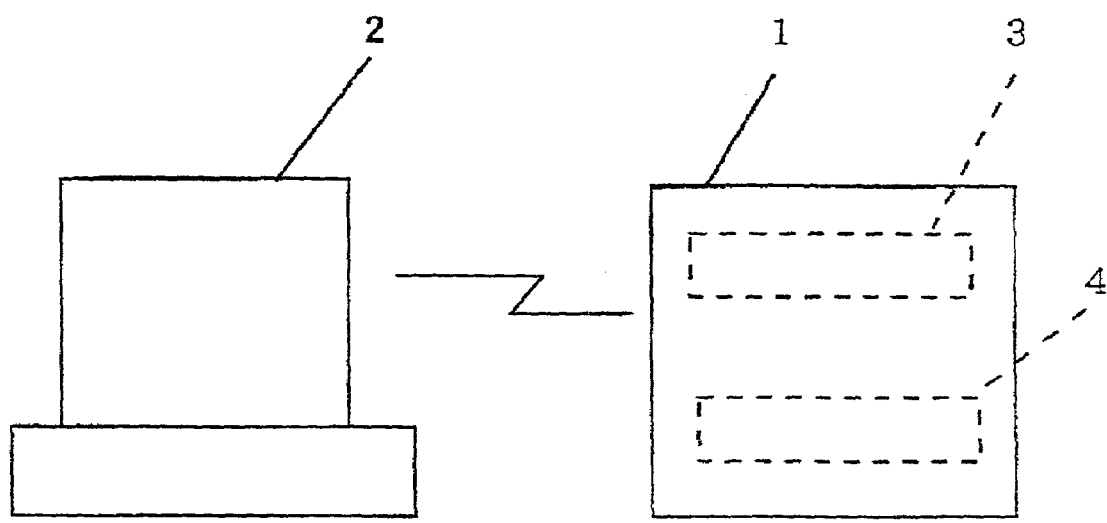
FIG. 1 is a schematic construction diagram showing a system in accordance with an embodiment of the present invention.

In FIG. 1, reference numeral 1 represents a host computer connected to the Internet and it is possible to access this server from user terminals, such as unspecified personal computers connected to a public communication network, such as the Internet.

The aforementioned host computer 1 includes a central processing unit (CPU) that is a main unit, a main memory (MM) connected via a bus, a hard disk device (HD), an input device (KBD), a display device (CRT), and a communication interface (I/F). The whole of this system is controlled by an OS (operating system), such as UNIX, LINUX, mainframe, Windows NT, or Windows 2000, installed on the hard disk device (HD).

Also, in the hard disk device (HD), there are registered a fundamental information recording file 3, an answer recording file 4, and a control program.

The control program is temporarily read onto the main memory (MM) and is further executed in sequence by the central processing unit (CPU).

The main function of this control program is to provide fundamental information through the Internet and to receive and record answers.

In the aforementioned fundamental information recording file 3, information given below is registered as the fundamental information.

(1) Commodity Specifications

For instance, there are registered an item name (a mobile telephone case), a size, a plurality of design images (for instance, three types of designs "A", "B", and "C", and a plurality of materials (for instance, two types of materials "X" and "Y") and the like.

(2) A Plurality of Expected Prices (for instance, 1500 yen and 3000 yen)

(3) Profile of Design Developer

Figure 2:
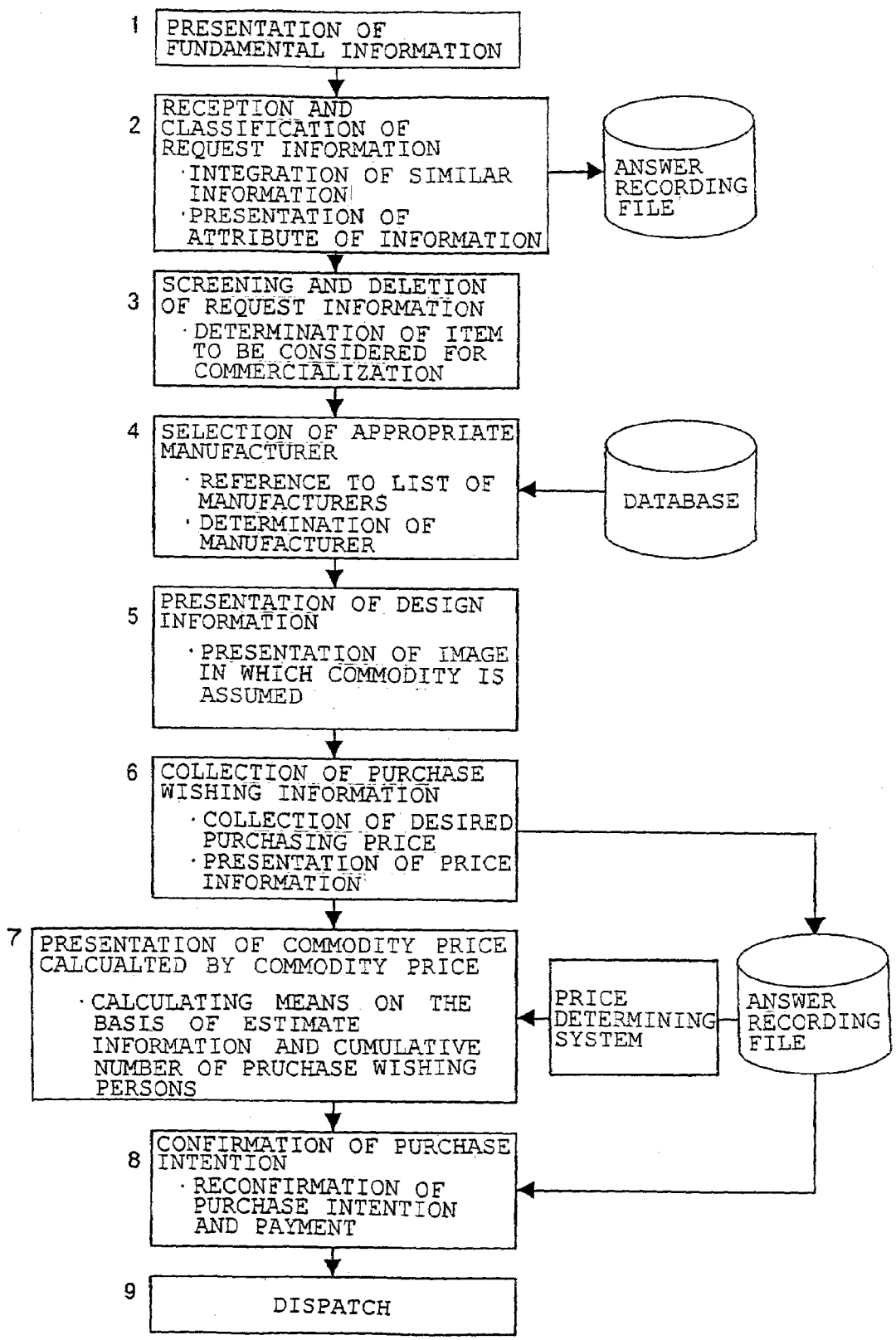
FIG. 2 is a flow chart showing processing of the embodiment.

When access from a user terminal is performed by specifying the URL (uniform resource locator) of the host computer 1, the fundamental information is displayed on a monitor screen of the user terminal (column 1 in FIG. 2). Here, an answerer (user) returns answers as to the following items and the answers are registered in the hard disk device (HD) of the host computer 1 by a CGI or the like.

During this operation, the user makes selections for the following items.

(1) Preferred design, material, and the like displayed on the monitor screen.

(2) The highest price, out of the plurality of expected prices displayed on the monitor screen, that the user thinks affordable. Whether the user will make a reservation for purchase or wishes to purchase the commodity (hereinafter, collectively referred to as the "purchase wish"). If the user does not wish to purchase the commodity, he/she answers as "not wishing to purchase" or terminates the connection to the host computer 1.

(3) Input attributes of the answerer (user) into attribute input fields (e-mail address, age, gender, address, hobby, magazine he/she purchases, and the like) displayed on the monitor screen.

These answers are recorded in the recording file 4 of the host computer 1 through the CGI (column 2 in FIG. 2).

The records are integrated with similar information (commodity specifications, such as a price, a size, a design, and a material) and are used to determine which item should be considered for commercialization (column 3 in FIG. 2).

Next, a procedure for determining which item should be considered for commercialization will be described below.

Each purchase wishing answerer (user) is a potential purchaser, so that the central processing unit (CPU) calculates the potential number of units to be sold by performing the following price determination.

In the case where 1000 units having the same specifications are produced, the expected price becomes 3000 yen. Also, in the case where 2000 units having the same specifications are produced, the expected price becomes 1500 yen. In the case where the aforementioned answer result shows that 1500 users wish to purchase the commodity at a price of 1500 yen and 500 users wish to purchase the commodity at a price of 3000 yen, 2000 users in total are expected to purchase the commodity at the price of 1500 yen (it is expected that each answerer whose desired price is 3000 yen will naturally purchase the commodity at the price of 1500 yen that is lower than their desired price, although it is preferable to obtain the final confirmation by e-mail, facsimile, telephone, or the like as a precaution).

Consequently, there is obtained an expectation that it is possible to sell this commodity at the price of 1500 yen.

After the final quantity in demand is confirmed in this manner, the central processing unit (CPU) performs the final estimation (or issues a formal estimate in the case where the commodity will be manufactured by another manufacturer), and the price of the commodity is determined.

Under the same conditions as above, in the case where 1000 users wish to purchase the commodity at the price of 1500 yen and 500 users wish to purchase the commodity at the price of 3000 yen, the total number of purchase candidates is 1500. Therefore, it is possible to sell the commodity at a price between 1500 yen and 3000 yen.

Consequently, on the basis of the estimation, a unit price is calculated for the case where 1,500 units of the commodity are manufactured (it is preferable that this computation is performed by registering an estimate and a computation formula in the hard disk device (HD) of the host computer 1). Then, the calculated unit price is reported to each purchase wishing person whose desired price is 1500 yen by e-mail and receives an answer from him/her.

On the basis of this answer, the number of purchase candidates and a price are determined and the central processing unit (CPU) determines whether the commodity should be put into production.

This makes it possible to obtain a reliable number of users and to set an appropriate selling price.

Under the same conditions as above, in the case where 1000 persons prefer a combination of the design type B and the material X and the number of persons who prefer each of other combinations of design types and materials is less than 500, if a judgment is made by limiting to the combination of the design type B and the material X, the selling price becomes 3000 yen and a result "production should be canceled" is obtained for each of the other combinations.

However, it is expected that some of the persons who prefer the other combinations will accept the combination of the design B and the material X. Therefore, there is made contact with answerers who selected the other combinations by e-mail or the like to seek an answer as to whether he/she wishes to purchase the commodity manufactured using the combination of B and X.

On the basis of this answer, the central processing unit (CPU) set the number of purchase candidates and a price and determines whether the commodity should be put into production.

This makes it possible to determine a reliable number of users and to set an appropriate selling price.

With the technique of this embodiment, it becomes possible to grasp demand trend as a range instead of a point (meaning that there may be a case where answerers (users) whose desired price is 1500 yen will purchase the commodity at a price of 2000 yen, a case where persons who selected the design A will purchase the commodity having the design B, and a similar case). This makes it possible to appropriately set users and a price of the specifications of a commodity that should be commercialized.

Customer information, such as answerer's attributes and desired commodity, obtained by following the procedure described above is stored in the hard disk device (HD) of the host computer 1. The usage of this customer information is not limited to the development of the commodity that is presently under development. That is, it is possible to use this customer information as user information (fundamental information) for the development of other commodities.

Second Embodiment

The second embodiment of the present invention will be described below by taking, as an example, the development of a case for a mobile telephone.

In this second embodiment, the first embodiment described above is combined with a unique price determining system.

The fundamental information recorded in the fundamental information recording file 3 is the same as that described in the first embodiment, although this information may contain only one expected price.

When the user terminal accesses the host computer 1 via the Internet, the fundamental information is transmitted and is displayed on the monitor of the computer 2 of the answerer (user) who has accessed the host computer 1 (column 1 in FIG. 2).

Here, the answerer (user) answers to items that are the same as those in the first embodiment. Then, the answers are transmitted to the host computer 1 and are recorded in the answer recording file 4 of the host computer 1 (column 2 in FIG. 2).

These records are integrated with similar information (commodity specifications, such as a price, a size, a design, and a material) and are used to determine which item should be considered for commercialization (column 3 in FIG. 2).

The item that should be considered for commercialization is determined by assuming the number of persons who made reservation for purchase, their desired prices, and an expected manufacturing cost. Even in the case where the expected manufacturing cost exceeds an expected amount of sales calculated from the number of persons who made reservation for purchase and their desired prices, if the difference therebetween falls within an allowable range determined as appropriate, the item will be considered for commercialization.

After the item that should be considered for commercialization is determined, a manufacturer that should manufacture the commodity is selected by referring to a database in which there are recorded manufacturer's names, the feature of each manufacturer, criteria for estimate, the state of availability of each facility, the stock state of each raw material, and the like (it is preferable that information showing the state of availability of each facility and the stock state of each raw material is successively updated by directly accessing the host computer from each manufacturer). Then, estimate is issued (column 4 in FIG. 2). In addition, design and other specifications are determined by assuming that the commodity will be commercialized, and the commodity specifications and an estimated price are transmitted to persons who made reservation for purchase. Further, processing is made to make it possible for persons other than the persons who made reservation for purchase to freely get access over the Internet (column 5 in FIG. 2).

Each person who accesses information concerning the commodity specifications answers whether he/she wishes to purchase the commodity using his/her own user terminal, and this answer is recorded in the answer recording file 4 of the host computer 1 (column 6 in FIG. 2).

In the price determining system described above, a manufacturing cost (including a design cost and sales sundry expenses) is compared with the expected amount of sales obtained by multiplying the number of purchase candidates by the estimated price recorded in the answer recording file 4. If it is expected that an appropriate profit will be obtained, it is determined that the commodity should be commercialized. In addition, the estimated price is determined as the selling price, and information, which shows that it is determined to commercialize the commodity, and price information are transmitted and presented to the purchase candidates (column 7 in FIG. 2).

In the above description, in the case where it is found, from the expected amount of sales, that it is impossible to obtain an appropriate profit, a message showing this situation is transmitted to the purchase candidates by e-mail or the like to find purchase candidates who wish to purchase the commodity at a price higher than the estimated price.

During this operation, as necessary, there is presented data showing the amount of money that is additionally required, the number of purchase candidates, and the like. Each purchase wishing person presents the amount of money that he/she will additionally spend by referring to this data.

Each person, who wishes to purchase the commodity even if the commodity is priced higher than the estimated price, answers the amount of money that he/she will spend, and this answered amount of money is recorded in the answer recording file 4 of the host computer 1. Note that each purchase wishing person, who will not spend money exceeding the estimated price, reports this fact to the host computer 1.

In the price determining system, on the basis of the program stored in the hard disk device (HD), the central processing unit (CPU) calculates how degree the amount of sales is increased by the answerers who are willing to spend money exceeding the estimated amount of money. If it is expected that a profit will be obtained as a result of this increase in the expected amount of sales, information, which shows that it is determined to commercialize the commodity, and price information are sent to the purchase candidates by e-mail (column 7 in FIG. 2).

Here, it is assumed that different prices are set for respective purchase candidates during this operation. That is, purchase candidates (users) who did not present prices higher than the estimated price is capable of purchasing the commodity at the estimated price, while each purchase wishing person who presented an increased price will purchase the commodity at the increased price that they presented.

It should be noted here that if judging that it is impossible to obtain a profit even in accordance with the procedure described above, the central processing unit (CPU) will abandon the commercialization of the commodity.

After the amount of money that each purchase wishing person should spend is determined in accordance with the procedure described above, the central processing unit (CPU) reconfirms the intention of the user (user terminal) to purchase the commodity by e-mail. After a payment is made, the commodity is dispatched (there may be a case where the commodity is manufactured after the payment is made) (column 9 in FIG. 2).

This price determining system allows each user to purchase the commodity at a price determined in accordance with the strength of his/her intention to purchase the commodity.

It is expected that each user whose purchase intention is weak does not present a purchasing price that is higher than the estimated price. If the number of such users is large, there exists a high possibility that the specifications will not be commercialized.

On the other hand, it is expected that each user whose purchase intention is strong will present an increased price that is determined in accordance with the strength of the purchase intention. If the number of such users is large, there exists a high potential that the specifications will be commercialized.

That is, each user whose purchase intention is weak must bear a risk that the specifications are not commercialized and it becomes impossible to obtain the commodity. On the other hand, there is expected a merit that if the commodity is commercialized, he/she is capable of purchasing the commodity at a low price.

Each user whose purchase intention is conversely strong can enjoy a merit that there is maintained a high possibility that the specifications will be commercialized, but needs to bear a risk that he/she is forced to purchase the commodity at a high price.

Although at least one expected price is presented as the fundamental information in the embodiment described above, a free answer may be obtained from each answerer without presenting such price.

It is thought that this price determination is preferable in view of customer satisfaction (each customer having a strong purchase intention will purchase the commodity with satisfaction even at a high price). As a result, there is promoted the individualized commercialization that has been impossible to realize with a conventional uniformly pricing system.

It is possible to implement the price determining system described above by departing the price determination from the development of commodity specifications. That is, commodity specifications including a design and the like are determined by assuming a commodity with an arbitrary method, the determined commodity specifications (column 5 in FIG. 2) are presented from the host computer 1 as the fundamental information, there are found purchase candidates, and a price is determined using the price determining system.

Third Embodiment

The third embodiment of the present invention will be described below by taking, as an example, the development of a case for a mobile telephone.

This third embodiment relates to an example of a case where demand trend is confirmed and commodity specifications are determined at a stage where the commodity specifications contain many undetermined elements.

The construction of a system in this embodiment is the same as those in the aforementioned first and second embodiments and the following information is recorded in the fundamental information recording file 3 as the fundamental information.

(1) Specification Menu for Each Element For instance,

{1} Size menu corresponding to the model of the mobile telephone

{2} Image menu for the overall shape

{3} Image menu for detailed shapes like a strap shape

{4} Color menu

{5} Material menu (2) Keyword Menu Expressing Commodity Image Using Language

Example expressions are "a round and cute impression" "a tough and wild impression", and "a simple impression"

As to this keyword menu, the specification concerning each element described above is related to a menu. When a keyword is selected, an image of the overall shape corresponding to this keyword is retrieved. In more detail, image data is grouped with respect to respective commodity images and it is possible to select the image data.

(3) Estimate Data as Necessary

Step 1 to step 4 described below will be repeated in accordance with the exchange of information between columns 1 and 2 in FIG. 2.

(Step 1)

When a computer 2 functioning as the user terminal accesses the host computer 1, a screen requesting the answerer to input his/her attributes is displayed on a monitor of the computer 2.

After the answers are recorded in the answer recording file 4 of the host computer, a screen requesting to select one of "keyword search" and "element selection" is displayed on the monitor of the computer 2 of the answerer (user).

Here, if the "keyword search" is selected, a keyword menu is transmitted to the answerer's (user's) computer 2 and the processing proceeds to step 2.

If the "element selection" is selected, an element menu is displayed on the monitor of the answerer's (user's) computer and the processing proceeds to step 3.

(Step 2)

The keyword menu transmitted from the host computer 1 is displayed on the monitor of the answerer's (user's) computer 2 and the answerer (user) selects a keyword matching his/her image and transmits the selected keyword to the host computer 1. This answer is recorded in the answer recording file 4 and the host computer 1 searches for an image of the overall shape corresponding to the selected keyword and transmits the image to the answerer (user).

The answerer (user) views the image displayed on the monitor and, if the displayed design completely differs from his/her image, the processing returns to step 1, in which the answerer performs the keyword selection again.

If the answerer hopes to make amendments to some extent, the processing proceeds to step 3. On the other hand, if there is no need to make amendments, the processing proceeds to step 4.

It is possible for the answerer to freely express the answer described above using a language. In this case, the answer is analyzed by a language analyzing software installed on the host computer and a corresponding image is retrieved.

(Step 3)

In step 3, the answerer selects a specification for each element from the menu in accordance with his/her preference and determines desired specifications of the commodity. In the case where "element selection" is selected in step 1, the processing proceeds to step 3 by bypassing step 2.

A case where a design retrieved as corresponding to the keyword selected in step 2 is amended will be mainly described below.

When an instruction to proceed to step 3 is inputted into the host computer 1, the element menu is outputted from the host computer 1 and this menu is displayed on the monitor of the answerer's (user's) computer 2.

That is, in the case where the answerer (user) selects the "detailed shape", a plurality of pieces of image data concerning the detailed shapes are displayed. In the case where the "color" is selected, a color palette is displayed.

Under this condition, the answerer (user) selects an image, a color, and the like matching his/her preference and returns these answers. Then, the answers are recorded in the answer recording file 4 of the host computer 1.

After the answerer (user) finishes answering (selection) concerning every element that he/she hopes to make amendments, he/she transmits a signal indicating that "selection is finished" from the computer 2 to the host computer 1.

On receiving the signal indicating that the selection is finished, the host computer 1 creates an image showing the overall shape of the commodity on the basis of each selected element, returns the image to the answerer's computer 2, and has the monitor display the image.

Although the image is processed by an image processing program installed on the hard disk device (HD) of the host computer 1, it is preferable that there is obtained a construction where it is possible to create and transmit three-dimensional data as well as two-dimensional data.

The answerer (user) checks the image data on the monitor of the computer 2. If the answerer is satisfied with this image, the processing proceeds to step 4. On the other hand, if the answerer hopes to make amendments, the amendment operation in step 3 is continued.

When a signal instructing to proceed to step 4 is inputted into the host computer 1, a message, which requests to input a desired purchasing price and an answer as to whether the answerer has an intention to purchase the commodity, is transmitted from the host computer 1 to the computer 2, and is displayed on the monitor of the answerer's (user's) computer 2.

The purchase wishing person inputs his/her desired price from the computer 2 and transmits the price to the host computer 1. In the host computer 1, answer data showing this desired price is recorded in the recording file 4.

(Step 5)

In the host computer 1, the central processing unit (CPU) checks the answer data of the desired price against the estimate information and data showing the cumulative number of purchase candidates, calculates the number of purchasers, which is required to make it possible to sell the commodity at the price desired by the answerers, and a price that would be set in the case where the commodity is commercialized at the current number of purchase candidates. Then, each answerer (user) is informed of the calculation results (a form that is different from the second embodiment of the price determining system in FIG. 2).

The operations from step 1 that are performed in sequence may be terminated at step 4 and step 5 may be performed on a different occasion to transmit the calculation results from the host computer to the e-mail address of each answerer.

By the operations described above, there are obtained commodity specifications of a commodity under development (for instance, a case for a mobile telephone), user's wishes concerning a price, and a list of potential customers. All of the information is stored in the hard disk device (HD) of the host computer 1.

It should be noted here that as to the desired price, in the example described above, each answerer inputs an arbitrary price. However, like in the first embodiment, a plurality of expected prices may be presented from the host computer 1 and each answerer may select his/her desired purchasing price therefrom.

With data obtained by requesting to input an arbitrary desired price or by receiving a selection of desired one from a plurality of expected prices, there is obtained data showing a correspondence between prices and demand. This makes it possible to set an appropriate price and to precisely forecast demand.

The central processing unit (CPU) determines the commodity specifications and a price, which are expected to generate a profit, on the basis of this data, and informs each answerer of the determined specifications and price.

Also, in the case where a user strongly wishes to purchase a commodity whose specifications differ from those of the determined commodity, the following procedure may be carried out. Data showing the specifications is stored in the host computer 1 so that it is possible to access the data via the Internet, thereby making it possible to find persons who wish to purchase the commodity having the specifications. Here, if there are found a predetermined number of purchase candidates, the commodity having the specifications is commercialized.

In the above embodiment, the commodity under development is a mobile telephone. In addition, as to concrete commodity specifications such as the size, overall shape, detailed shapes, color, and material corresponding to the model of the mobile telephone, a plurality of ideas are created in advance, are recorded as fundamental information, and are transmitted. However, as to the initial fundamental information, only "the name of an item under development" may be transmitted as the commodity specifications to request answerers to freely answer their opinions concerning the commodity under development, and the answers are recorded in the answer recording means. This process is also included in the scope of the present invention.

In this case, the answers are analyzed and a plurality of ideas concerning concrete commodity specifications, such as the overall shape and detailed shapes, are created on the basis of the answers. Following this, the operation in the aforementioned first embodiment is performed. Alternatively, steps in the aforementioned second embodiment are performed.

There may be found purchase candidates by determining the final commodity specifications on the basis of the answers. In this case, there may be used two procedures given below.

(First)

The host computer 1 presents commodity specifications and a price, which have been finally determined as fundamental information, to ask recipients (users) shown by the fundamental information whether they wish to purchase the commodity. Then, the answers are recorded in the answer recording file 4.

When the number of purchase candidates reaches a number corresponding to a set price, the commodity is manufactured and sold.

(Second)

The finally determined commodity specifications and a plurality of candidate prices (for instance, 1000 yen, 2000 yen, and 3000 yen) are presented as fundamental information to collect answers as to whether each user wishes to purchase the commodity and to ask each user to select a desired purchasing price. The answers are recorded in the answer recording file 4. The method of utilizing these answers is the same as the answer utilizing method described in the first embodiment.

It should be noted here that a desired price may be freely answered by each answerer.

In the above embodiment, the system of the present invention may be used to develop a commodity at a stage where which item should be developed has been determined or the development item itself has been determined on the basis of opinions collected from answerers. An example of a procedure carried out in this case is described below.

(Step 1)

When attribute information of an answerer is registered, there are registered his/her hobby, design taste, and desired commodity. For instance, there is registered a text "Mr. A lives alone, prefers commodities having a sharp design, and is currently looking for a facsimile having a sharp design".

(Step 2)

Registrants, out of a plurality of registrants, who have similar tastes and are looking for the same commodity, are classified into the same group (grouping in accordance with a common purpose function).

(Step 3)

A message, which shows that there exist members having the same taste, and an expected price of a commodity calculated on the basis of the current number of group members are reported to members constituting the same group (by e-mail, facsimile, telephone, or the like).

At this stage, the processing may proceed to the procedure in the aforementioned first to third embodiments. However, the processing may alternatively proceed to the following step.

(Step 4)

A community is formed by the members on a home page to collect answers concerning a price. Then, in the case where the expected price falls within an allowable range, commodity specifications are determined and a commodity is manufactured and sold. The procedure for determining the commodity specifications in this case is the same as that described in the first embodiment or the third embodiment.

In the case where the expected price exceeds the allowable range, the processing waits for the number of group members to be increased. Then, when there is obtained an appropriate price, the processing proceeds to the determination of the commodity specifications.

In the three embodiments described above, there has been described, as an example, the determination of commodity specifications of a mobile telephone case that is an industrial product. However, specifications of a service commodity may be set by following a procedure that is fundamentally the same as that described above.

For instance, in the case where a travel commodity is developed, the destination, the number of travel days, sightseeing spots, the hotel for stay, foods, and the like may be determined as specification elements. A plurality of menus are prepared for respective elements to make it possible for each answerer to make selections.

In accordance with the present invention, there are presented candidates for commodity specifications before the commodity specifications are determined, thereby collecting answers. Following this, the commodity specifications, price, the number of units to be manufactured, and the like can be determined.

Accordingly, it is possible to grasp the minimum number of units to be sold before the commodity is put on sale. Also, it is possible to determine the price in accordance with the grasped number (that is, it is possible to obtain a commodity whose commodity specifications and price are suited for preferences of users). This makes it possible to significantly reduce a risk involved in commodity development.

Also, with the list of potential customers, it is possible to precisely calculate the minimum number of lots to be produced (appropriate number of produced lots) and to dispatch, to customers, products immediately after production without stocking them. Therefore, there is no need for a manufacturer to bear a cost to stock the products. Further, if a deposit is collected from the potential customers in advance when it is determined to start production, it is also possible to reduce a load concerning financing.

As a result, with this system, a risk involved in the production of small lots of a variety of products can be reduced. In addition, it is possible to reduce a risk involved in the development of a new commodity by medium and small-sized businesses that are subjected to a considerable risk during the development of a commodity. As a result, it is expected that the development of new commodities will be invigorated.

Further, the commodity development is performed while keeping customers in advance, so that it is not required to expend an advertisement and commercial cost and a sales cost and it is not required to increase a price in view of a risk. As a result, it becomes possible to sell the commodity at a price that is close to a manufacturing cost.

Also, users are not forced to purchase ready-made commodities provided by manufacturers. That is, they are capable of obtaining commodities that are closer to their preferences at relatively low prices.

As described above, with this system, concrete commodity specifications and a price wished by users and purchase candidates are obtained as information, the final specifications and price are determined with reference to the obtained information, and the commodity is commercialized. As a result, it becomes possible to reduce a risk involved in commodity development as little as possible.

Consequently, in an industrial community that cannot cope with the need to produce small lots of a variety of products because it is impossible to precisely grasp user's needs although it is desired to shift from the mass manufacturing of one type of product to the production of small lots of a variety of products because of the increase of the variety of user's needs, this system is extremely beneficial because the system makes it possible to produce small lots of a variety of products at a small risk.

Also, customer information collected with this system for the development of a commodity is also effectively used as development data for other commodities.

Fourth Embodiment

Figure 3:
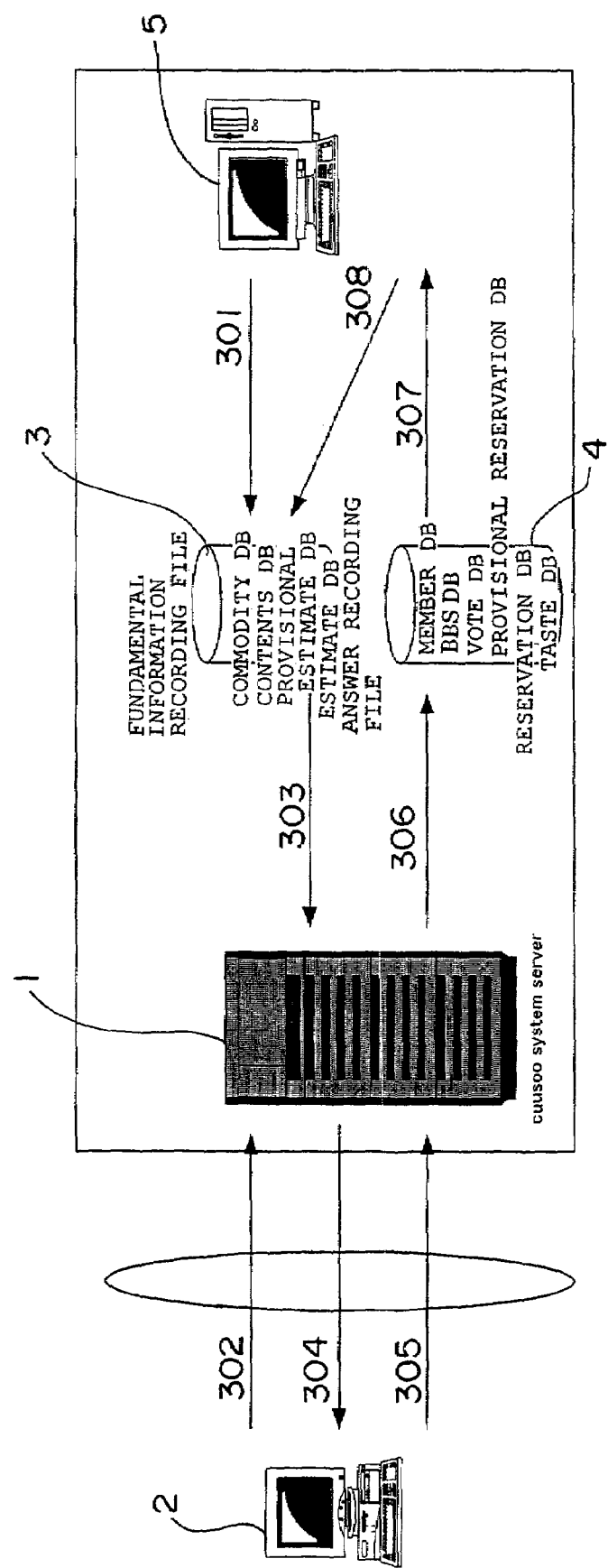
FIG. 3 is a system construction diagram showing an idea presenting step of the embodiment.
Figure 4:
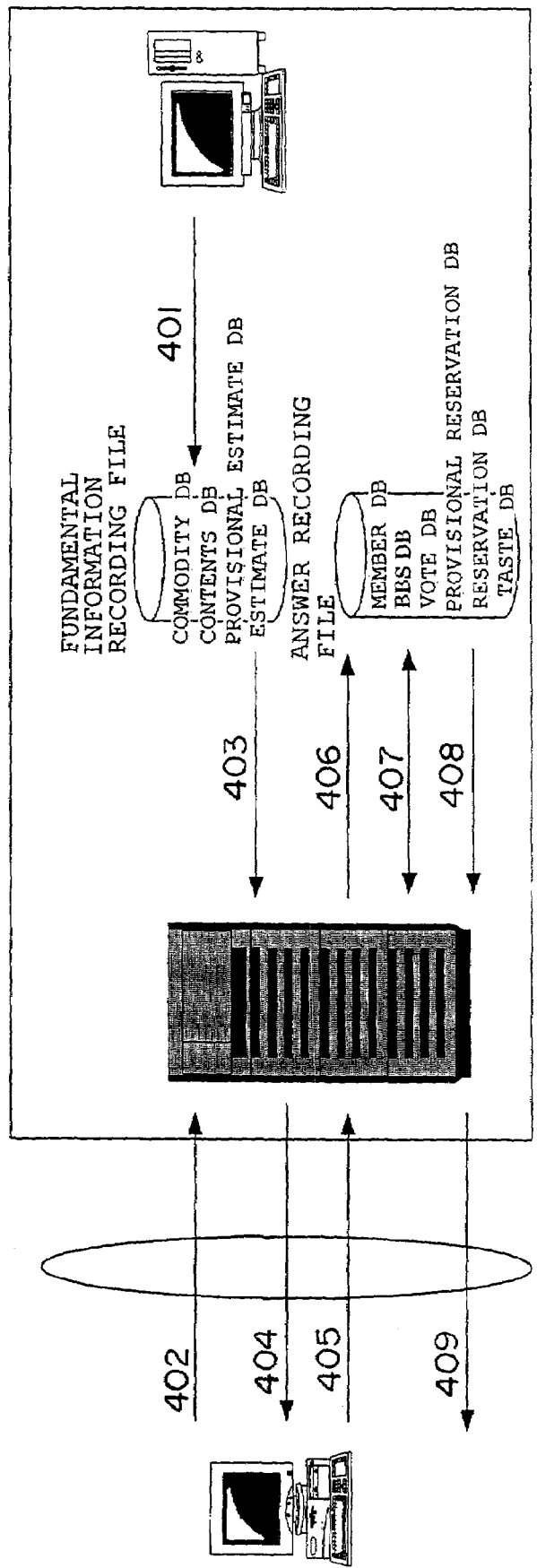
FIG. 4 is a system construction diagram showing a provisional reservation step of the embodiment.
Figure 5:
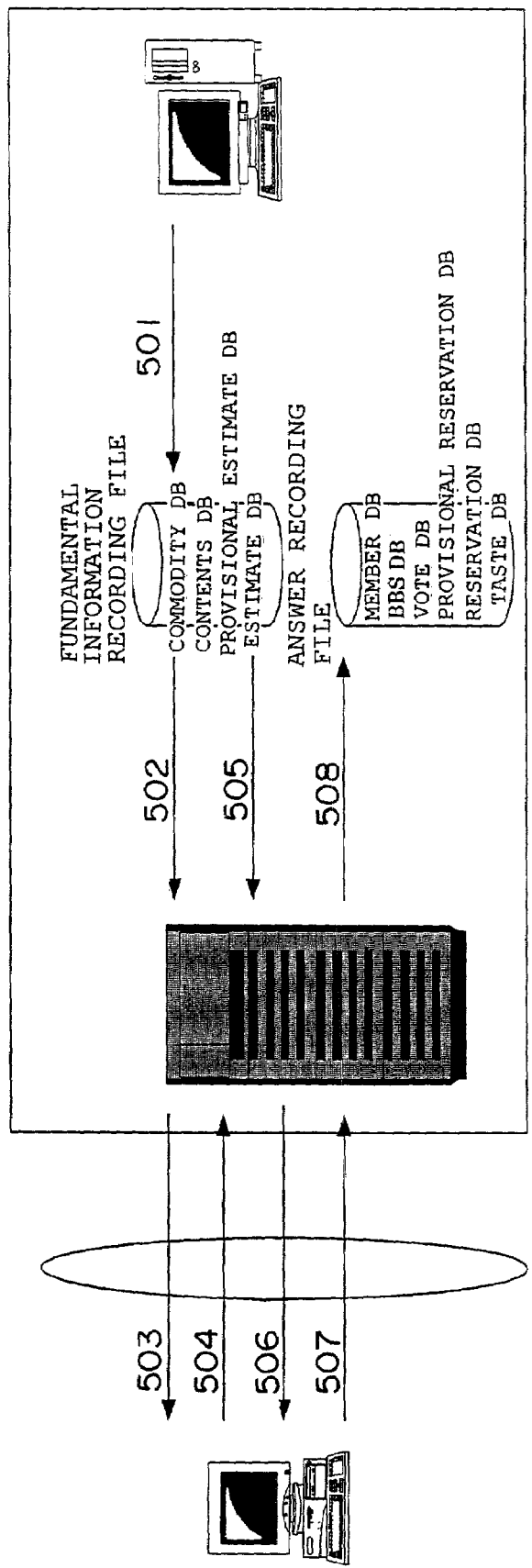
FIG. 5 is a system construction diagram showing a reservation step of the embodiment.

FIG. 3 to FIG. 5 illustrate the aforementioned first to third embodiments in more detail. As described above in each embodiment, the computer 2 is connected to the host computer 1 via the Internet.

Among these drawings, FIG. 3 shows processing illustrating the presentation of ideas from the host computer 1.

The host computer 1 has the fundamental information recording file 3 and the answer recording file 4 and it is possible to update each of these files via a console 5 (step 301).

Next, a user accesses the host computer 1 from the computer 2 by specifying a URL (302).

The central processing unit of the host computer 1 automatically generates a Web page describing ideas of a commodity from the fundamental information recording file 3 (303).

The user refers to the page describing the commodity ideas (304). A screen showing this page is shown in FIG. 18.

Figure 19:
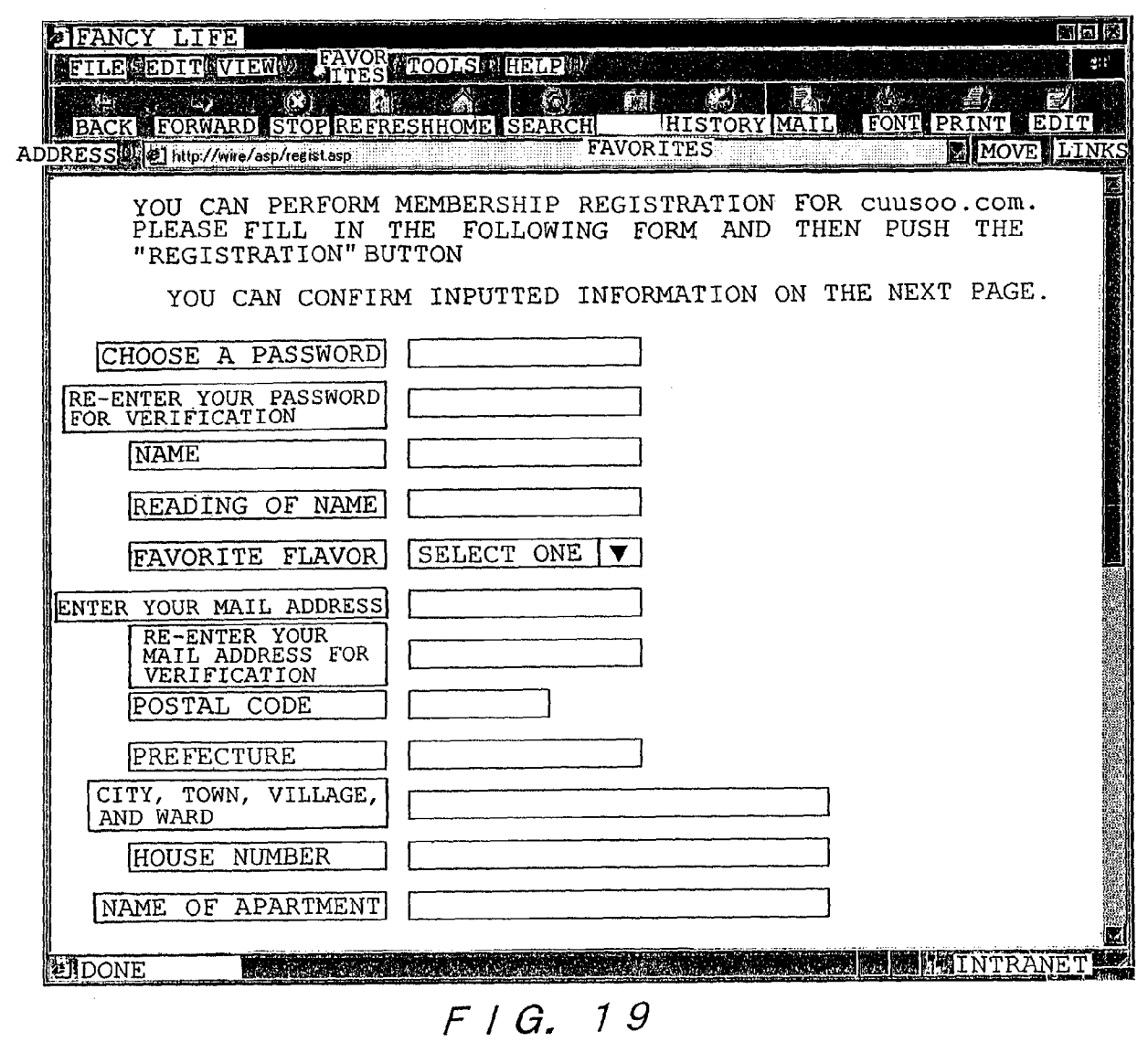
Figure 20:
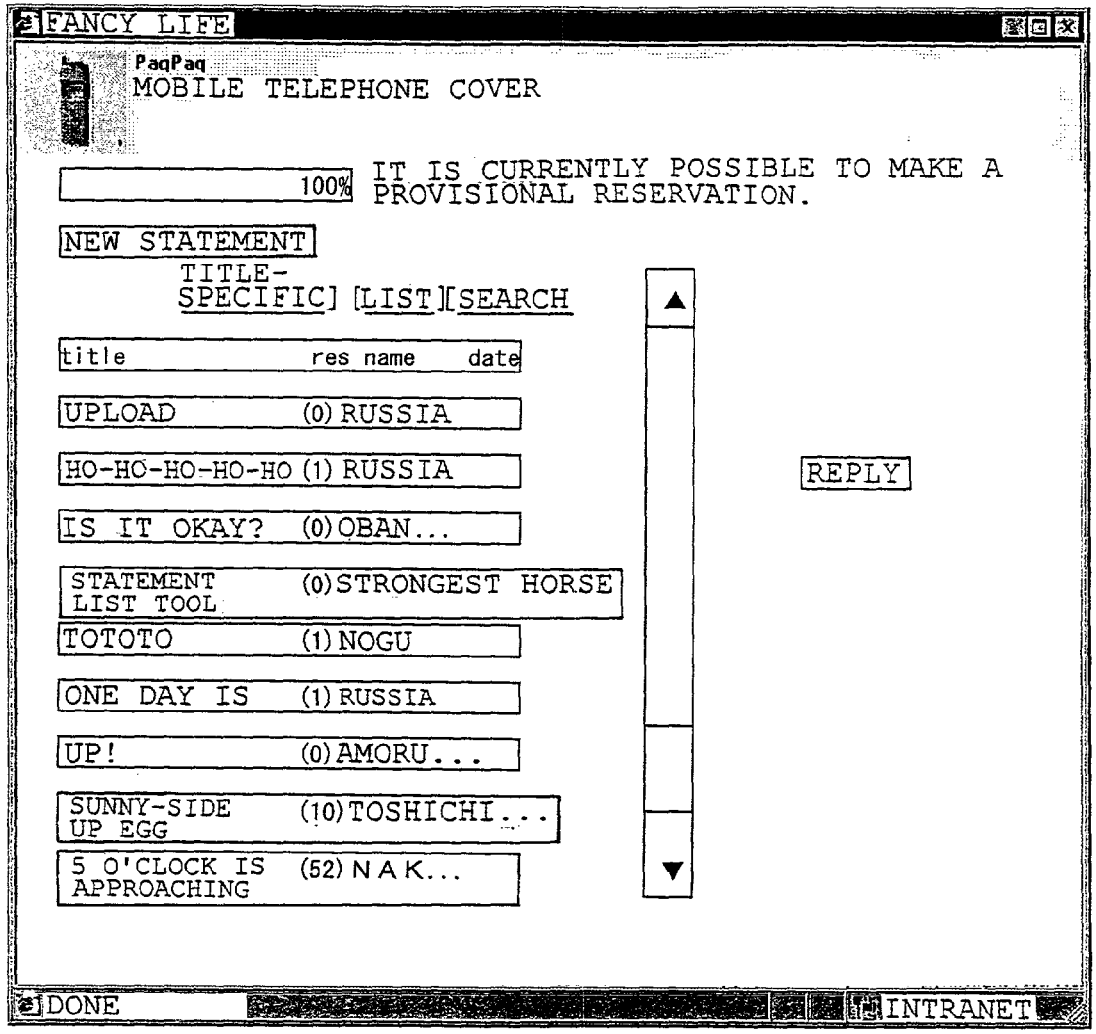
FIG. 20 shows a BBS writing screen displayed on the user's monitor in the embodiment.

Here, if having not yet performed membership registration, the user performs membership information registration before writing opinions and the like about the commodity ideas into a BBS (305). A screen, through which the user performs the membership registration, is shown in FIG. 19, while a screen, through which the user writes the opinions and the like into the BBS, is shown in FIG. 20.

Figure 21:
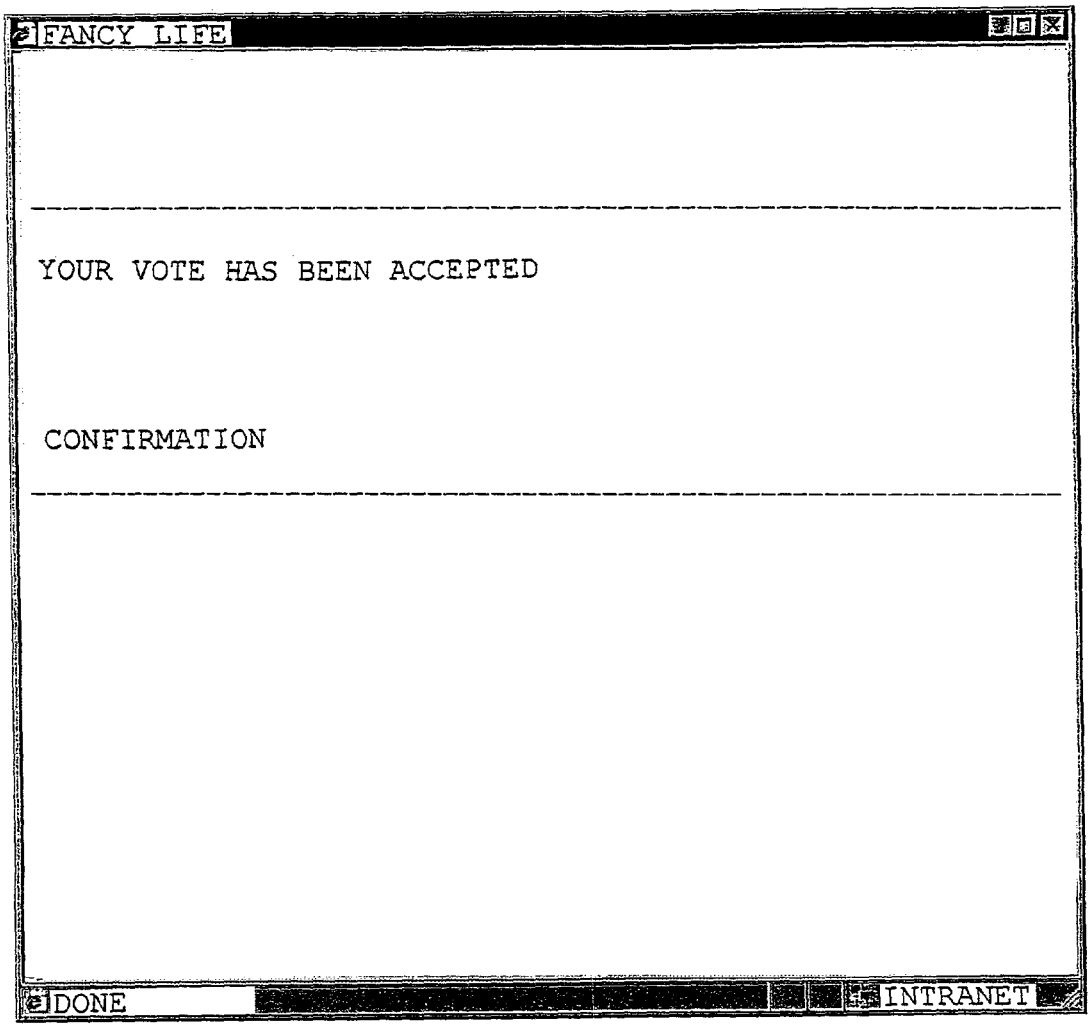
FIG. 21 shows a vote screen displayed on the user's monitor in the embodiment.

Also, it is possible for the user to vote for a commodity that he/she prefers. A screen, through which the user votes for the commodity, is shown in FIG. 21.

The central processing unit of the host computer 1 updates the answer recording file 4 on the basis of the attributes of users, who have not yet done membership registration, and the contents written into the BBS. Also, the answer recording file 4 may be updated using vote results (306).

It is possible for a host to refer to opinions about the commodity ideas and a current vote situation via the console 5 (307).

The host then updates the fundamental information recording file 3 using an idea, in which user's opinions have been incorporated (308).

Steps 302 to 308 described above are repeated to determine the specifications of a commodity.

FIG. 4 shows a procedure for making a provisional reservation.

The host writes a provisional estimate information, which concerns the manufacturing of a product and has been obtained from a manufacturer on the basis of the commodity idea specifications, into the fundamental information recording file 3 of the host computer 1 via the console 5 (401).

The user accesses the host computer 1 from the computer 2 via the Internet (402).

The central processing unit of the host computer 1 automatically generates a Web page, in which the commodity is shown with a plurality of prices expected for respective lots, from the fundamental information recording file 3 (403).

The user views the Web page generated in this manner using the monitor of the computer 2 (404).

Figure 22:
FIG. 22 shows a provisional reservation screen displayed on the user's monitor in the embodiment.

The user makes a provisional reservation by selecting a desired purchasing price using the computer 2 (405). A screen, through which the provisional reservation is made in this step, is shown in FIG. 22.

The central processing unit (CPU) of the host computer 1 updates the answer recording file 4 using the contents of the provisional reservation (406).

Next, the central processing unit (CPU) of the host computer 1 creates a taste database from the answer recording file 4 by grouping members having the same taste (407).

Next, demand is forecasted and an expected selling price is calculated from the answer recording file 4. Then, potential purchase wishing members corresponding to the expected selling price (408) are extracted.

Then, finally, an e-mail giving purchase information that presents a current price is generated and sent to each member (409).

The precision of demand forecast is improved and the commodity price is determined by repeating steps 402 to 409 described above.

FIG. 5 shows a procedure for making a final reservation.

The host writes estimate information, that concerns the manufacturing of the commodity and has been obtained from a manufacturer on the basis of the commodity specifications, into the fundamental information recording file 3 of the host computer 1 via the console 5 (501).

Next, the central processing unit (CPU) of the host computer 1 extracts purchase candidates from the answer recording file 4 (502).

Next, the central processing unit (CPU) of the host computer 1 generates a purchase information mail, which presents the commodity specifications and an estimated price, and delivers the mail to each member (503).

Next, the user accesses the host computer 1 from the computer 2 via the Internet (504).

In response to this access, the central processing unit (CPU) automatically generates a Web page, in which the commodity is shown with a selling price, from the fundamental information recording file 3 (505).

The user knows the selling price by viewing the Web page generated in the aforementioned step using the monitor of the computer 2 (506).

Then, the user performs reservation processing using the computer 2 in the case where he/she agrees with the presented selling price (507). A screen, through which the reservation processing is performed in this step, is shown in FIG. 23.

When the reservation processing is performed, the central processing unit of the host computer 1 updates the answer recording file 4 using the contents of the reservation described above (508).

FIG. 6 shows the contents of the fundamental information recording file 3 and the answer recording file 4 of the host computer.

As shown in this drawing, the fundamental information recording file 3 includes a commodity database, a contents database, a provisional estimate database, and an estimate database.

On the other hand, the answer recording file 4 includes a member database, a BBS database, a vote database, a provisional reservation database, a reservation database, and a taste database.

FIG. 7 shows item names, attributes, and sample values registered in the commodity database in the fundamental information recording file 3.

Similarly, FIG. 8 shows the contents of the contents database, FIG. 9 shows the contents of the provisional estimate database, and FIG. 10 shows the contents of the estimate database.

On the other hand, FIGS. 11 to 17 each show the contents of the databases in the answer recording file 4. In more detail, FIGS. 11 and 12 each show the contents of the member database, FIG. 13 shows the contents of the BBS database, FIG. 14 shows the contents of the vote database, FIG. 15 shows the contents of the provisional reservation database, and FIGS. 16 and 17 each show the contents of the reservation database.

INDUSTRIAL APPLICABILITY

The present invention is used for the planning of a commodity via a network and is also applicable to the development of a travel commodity.

The invention claimed is:

1. A system for collecting commodity specifications and related customer information, comprising:
 a fundamental information presenting processor configured to present fundamental information concerning a commodity under development to an answerer by utilizing a bidirectional communication system that uses a computer, the fundamental information including a plurality of commodity specifications and a plurality of expected selling prices;
 an answer recording processor configured to receive and record an answer from the answerer by utilizing the bidirectional communication system that uses the computer, the answer including desired commodity specifications, purchase candidate prices and intent to purchase the commodity; and
 a commodity price calculating processor configured to calculate a first commodity price by multiplying the cumulative number of purchase candidates by their desired respective purchasing prices, to compare the calculated first commodity price to a manufacturing cost, and to transmit to each purchase candidate a message showing that the first commodity price is less than a required amount subsequent to the comparison indicating that an appropriate profit will not be generated, the message further requesting the purchase candidate to increase the desired purchasing price,
 wherein said answer recording processor is configured to receive and record a modified desired purchasing price from a purchase candidate having received the message, and
 wherein said commodity price calculating processor is configured to calculate a second commodity price based on said modified desired purchasing prices, to compare the second commodity price to the manufacturing cost, and to send to the purchase candidates an indication that the commodity will be commercialized and price information subsequent to the comparison indicating that the appropriate profit will be generated as a result of the modified desired purchasing prices.

2. The system for collecting commodity specifications and related customer information according to claim 1, wherein said commodity price calculating processor is configured to send an estimated first price as pricing information of the commodity to the purchase candidates who did not answer said message with an increased desired purchasing price, and to send an increased second price as pricing information of the commodity to the purchase candidates who did answer said message with an increased desired purchasing price subsequent to the comparison indicating that the appropriate profit will be generated as a result of the modified desired purchasing prices.

3. The system for collecting commodity specifications and related customer information according to claim 1, wherein said commodity price calculating processor is configured to calculate the second commodity price based on one or more of said modified desired purchasing prices and one or more of said desired purchasing prices.

4. A method for collecting commodity specifications and related customer information, comprising:
 presenting, using a fundamental information presenting mechanism, fundamental information concerning a commodity under development to an answerer by utilizing a bidirectional communication system that uses a computer, the fundamental information including a plurality of commodity specifications and a plurality of expected selling prices;
 receiving and recording, using an answer recording mechanism, an answer from the answerer by utilizing the bidirectional communication system that uses the computer, the answer including desired commodity specifications, purchase candidate prices and intent to purchase the commodity;
 calculating, using a commodity price calculating mechanism, a first commodity price by multiplying the cumulative number of purchase candidates by their desired respective purchasing prices;
 comparing, using said commodity price calculating mechanism, the calculated first commodity price to a manufacturing cost;
 transmitting, using said commodity price calculating mechanism, to each purchase candidate a message showing that the first commodity price is less than a required amount subsequent to the comparison indicating that an appropriate profit will not be generated, the message further requesting the purchase candidate to increase the desired purchasing price;

receiving and recording, using said answer recording mechanism, a modified desired purchasing price from a purchase candidate having received the message;

calculating, using said commodity price calculating mechanism a second commodity price based on said modified desired purchasing prices;

comparing, using said commodity price calculating mechanism, the second commodity price to the manufacturing cost; and sending, using said commodity price calculating mechanism, to the purchase candidates an indication that the commodity will be commercialized and price information subsequent to the comparison indicating that the appropriate profit will be generated as a result of the modified desired purchasing prices.

5. The method for collecting commodity specifications and related customer information according to claim 4, wherein said commodity price calculating mechanism is configured to send an estimated first price as pricing information of the commodity to the purchase candidates who did not answer said message with an increased desired purchasing price, and to send an increased second price as pricing information of the commodity to the purchase candidates who did answer said message with an increased desired purchasing price subsequent to the comparison indicating that the appropriate profit will be generated as a result of the modified desired purchasing prices.

6. The method for collecting commodity specifications and related customer information according to claim 4, wherein said commodity price calculating mechanism is configured to calculate the second commodity price based on one or more of said modified desired purchasing prices and one or more of said desired purchasing prices.

7. A computer-readable recording medium recorded with a program for making a server collect commodity specifications and related customer information, said program comprising instructions for:

presenting fundamental information concerning a commodity under development to an answerer by utilizing a bidirectional communication system that uses a computer, the fundamental information including a plurality of commodity specifications and a plurality of expected selling prices;

receiving and recording an answer from the answerer by utilizing the bidirectional communication system that uses the computer, the answer including desired commodity specifications, purchase candidate prices and intent to purchase the commodity;

calculating a first commodity price by multiplying the cumulative number of purchase candidates by their desired respective purchasing prices;

comparing the calculated first commodity price to a manufacturing cost; and transmitting to each purchase candidate a message showing that the first commodity price is less than a required amount subsequent to the comparison indicating that an appropriate profit will not be generated, the message further requesting the purchase candidate to increase the desired purchasing price, receiving and recording a modified desired purchasing price from a purchase candidate having received the message;

calculating a second commodity price based on said modified desired purchasing prices;

comparing the second commodity price to the manufacturing cost; and sending to the purchase candidates an indication that the commodity will be commercialized and price information subsequent to the comparison indicating that the appropriate profit will be generated as a result of the modified desired purchasing prices.

8. The computer-readable recording medium according to claim 7, wherein said program further comprises instructions for:

sending an estimated first price as pricing information of the commodity to the purchase candidates who did not answer said message with increased desired purchasing prices; and sending an increased second price as pricing information of the commodity to the purchase candidates who did answer said message with increased desired purchasing prices;

subsequent to the comparison indicating that the appropriate profit will be generated as a result of the modified desired purchasing prices.

9. The computer-readable recording medium according to claim 7, wherein said program further comprises instructions for calculating the second commodity price based on one or more of said modified desired purchasing prices and one or more of said desired purchasing prices.

* * * * *